United States Patent
Bendak et al.

(10) Patent No.: US 7,054,336 B1
(45) Date of Patent: May 30, 2006

(54) SYSTEM AND METHOD FOR PROGRAMMING THE QUANTITY OF FRAME SYNCHRONIZATION WORDS IN A MULTIDIMENSIONAL DIGITAL FRAME STRUCTURE

(75) Inventors: George Beshara Bendak, San Diego, CA (US); Alan Michael Sorgi, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 958 days.

(21) Appl. No.: 09/746,152

(22) Filed: Dec. 22, 2000

(51) Int. Cl.
*H04J 3/06* (2006.01)
(52) U.S. Cl. ...................... 370/509; 370/512
(58) Field of Classification Search ........... 370/395.62, 370/469, 471, 503, 507, 509, 510, 511, 512, 370/513, 514, 465, 470, 472, 473, 474
See application file for complete search history.

(56) References Cited

U.S. PATENT DOCUMENTS

| | | | |
|---|---|---|---|
| 5,251,205 A | 10/1993 | Callon et al. | |
| 5,490,252 A | 2/1996 | Macera et al. | |
| 5,568,471 A | 10/1996 | Hershey et al. | |
| 5,661,763 A | 8/1997 | Sands | |
| 5,666,108 A | 9/1997 | Duffy | |
| 5,778,000 A | 7/1998 | Dosiere et al. | |
| 5,793,976 A | 8/1998 | Chen et al. | |
| 5,854,699 A | 12/1998 | Olshansky | |
| 5,875,396 A | 2/1999 | Stockton et al. | |
| 5,955,959 A * | 9/1999 | Taki et al. | 340/3.2 |
| 5,982,743 A | 11/1999 | Kusano | |
| 5,987,024 A * | 11/1999 | Duch et al. | 370/350 |
| 6,006,069 A | 12/1999 | Langston | |
| 6,522,665 B1 * | 2/2003 | Suzuki et al. | 370/471 |
| 6,819,679 B1 * | 11/2004 | Kerns et al. | 370/474 |

* cited by examiner

*Primary Examiner*—Phirin Sam
(74) *Attorney, Agent, or Firm*—Terrance A. Meador (57) ABSTRACT

A system and method have been provided for programming synchronization features of a multidimensional digital frame structure. Such a frame structure acts as a digital wrapper and includes overhead, payload, and forward error correction (FEC) sections. Words in the overhead section are used to synchronize the frame structure. The described invention permits the quantity of the frame synchronization bytes (FSBs) to be made programmable, so that the system and method are flexible for changes in communication protocols.

38 Claims, 5 Drawing Sheets

SYSTEM AND METHOD FOR PROGRAMMING THE QUANTITY OF FRAME SYNCHRONIZATION WORDS IN A MULTIDIMENSIONAL DIGITAL FRAME STRUCTURE

RELATED APPLICATIONS

This application contains material related to the following commonly assigned copending U.S. Patent Applications incorporated herein by reference:

Ser. No. 09/746,490 filed 22 Dec. 2000 for "SYSTEM AND METHOD FOR PROGRAMMING THE LOCATION OF FRAME SYNCHRONIZATION WORDS IN A MULTIDIMENSIONAL DIGITAL FRAME STRUCTURE"

Ser. No. 09/745,655 filed 22 Dec. 2000 for "SYSTEM AND METHOD FOR PROGRAMMING THE VALUE OF FRAME SYNCHRONIZATION WORDS IN A MULTIDIMENSIONAL DIGITAL FRAME STRUCTURE"

Ser. No. 09/747,380 filed 22 Dec. 2000 for "SYSTEM AND METHOD FOR PROGRAMMING THE BIT ERROR RATE OF FRAME SYNCHRONIZATION WORDS IN A MULTIDIMENSIONAL DIGITAL FRAME STRUCTURE"

Ser. No. 09/745,793 filed 22 Dec. 2000 for "SYSTEM AND METHOD FOR SELECTIVELY BROADCASTING A MULTIDIMENSIONAL DIGITAL FRAME STRUCTURE"

Ser. No. 09/747,072 filed 22 Dec. 2000 for "SYSTEM AND METHOD FOR PROGRAMMING LOSS OF SYNCHRONIZATION IN A MULTIDIMENSIONAL DIGITAL FRAME STRUCTURE"

Ser. No. 09/745,744 filed 22 Dec. 2000 for "SYSTEM AND METHOD FOR PROGRAMMING SYNCHRONIZATION CRITERIA IN A MULTIDIMENSIONAL DIGITAL FRAME STRUCTURE"

Ser. No. 09/746,159 filed 22 Dec. 2000 for "SYSTEM AND METHOD FOR TRANSLATING OVERHEAD BYTES IN A MULTIDIMENSIONAL DIGITAL FRAME STRUCTURE"

Ser. No. 09/527,343, filed 17 Mar. 2000 for "TRANSPOSABLE FRAME SYNCHRONIZATION STRUCTURE"

Ser. No. 09/528,021, filed 17 Mar. 2000 for "PROGRAMMABLE SYNCHRONIZATION STRUCTURE WITH AUXILIARY DATA LINK"

BACKGROUND OF THE INVENTION

1. Field of the Invention

This invention generally relates to communications embodied with a digital wrapper and, more particularly, to a system and method for programming the selection of frame synchronization words in a communication frame structure.

2. Description of the Related Art

Frame synchronization is used in most communication technologies where extra bandwidth is required to add functionality into the original data stream. There is no standard practice with respect to the bandwidth allocation of frame synchronization words. Neither is there an ability to customize the use of that bandwidth and synchronization thresholding, adaptive to various bit error rate conditions in a variable rate forward error correction (FEC) system implementing interleaved or multiple-frame superframes.

It would increase bandwidth if all the bytes, or words of a digital frame structure could be devoted to payload. However, a significant portion of the frame is devoted to FEC to remove errors that are introduced in data transmission lines. Even fiber optic systems can be noisy enough to introduce errors, when the distance between nodes is great enough. Part of the frame must also be used for maintenance functions between communication nodes. Further, a portion of the frame lo must be devoted to synchronization. The synchronization function becomes even more critical when the frames are scrambled to randomize the data density. These maintenance and synchronization bytes reside in the overhead section of the frame. However, as mentioned above, there is no standard protocol defining the quantity, location, or value of frame synchronization bytes. Hardware devoted to any particular protocol or implementation quickly becomes obsolete. An exclusively software approach to managing communications is cumbersome.

It would be advantageous if communication hardware could be developed that permitted flexibility in defining the frame synchronization bytes, so as to permit the hardware to be used in a number of communication standards.

It would be advantageous if the quantity of frame synchronization bytes (FSBs) could be made selectable in a multidimensional digital frame structure.

Likewise, it would be advantageous if the location, value, and bit error rates of the FSBs could be made selectable to accommodate a number of communication standards, or changes to existing standards.

SUMMARY OF THE INVENTION

Accordingly, an integrated circuit communication device is provided that includes programmable features to allocate bandwidth for frame synchronization words, and set up the error thresholding so as to adjust the robustness to bit errors and the time required to achieve synchronization. More specifically, the device provides for:

a programmable frame synchronization word bandwidth;
programmable frame synchronization words;
different synchronization words with independent allocated bandwidths;
frame synchronization word translation between the decoder and encoder;
frame synchronization word error thresholding for system robustness;
programmable synchronization (in-to-sync) parameters; and
programmable out-of-sync synchronization parameters.

Broadly, this invention describes a structure for programming key features for a frame synchronization system using a multidimensional digital frame. More particularly, an example of the invention is provided in a programmable framing structure for a forward error correction (FEC) encoded channel interleaved to 16 levels with a 4 frame superframe. The structure provides the user with the ability to allocate the amount of bandwidth dedicated to the frame synchronization, words, to control the speed of synchronization, and the robustness to channel noise. As an added benefit, a programmable synchronization threshold can be set to even further increase the robustness to channel noise and to decrease the synchronization time under high bit error rate conditions. These techniques, together and independently, permit increased network security and partitioning, as well as to dynamic reallocation of the bandwidth occupied for framing based on link conditions, without corrupting user data.

Details of the programmable communication IC and a method for variably programming the frame synchronization structure in a multidimensional digital frame structure are provided below.

DETAILED DESCRIPTION OF THE PREFERRED EMBODIMENTS

Figure 1:
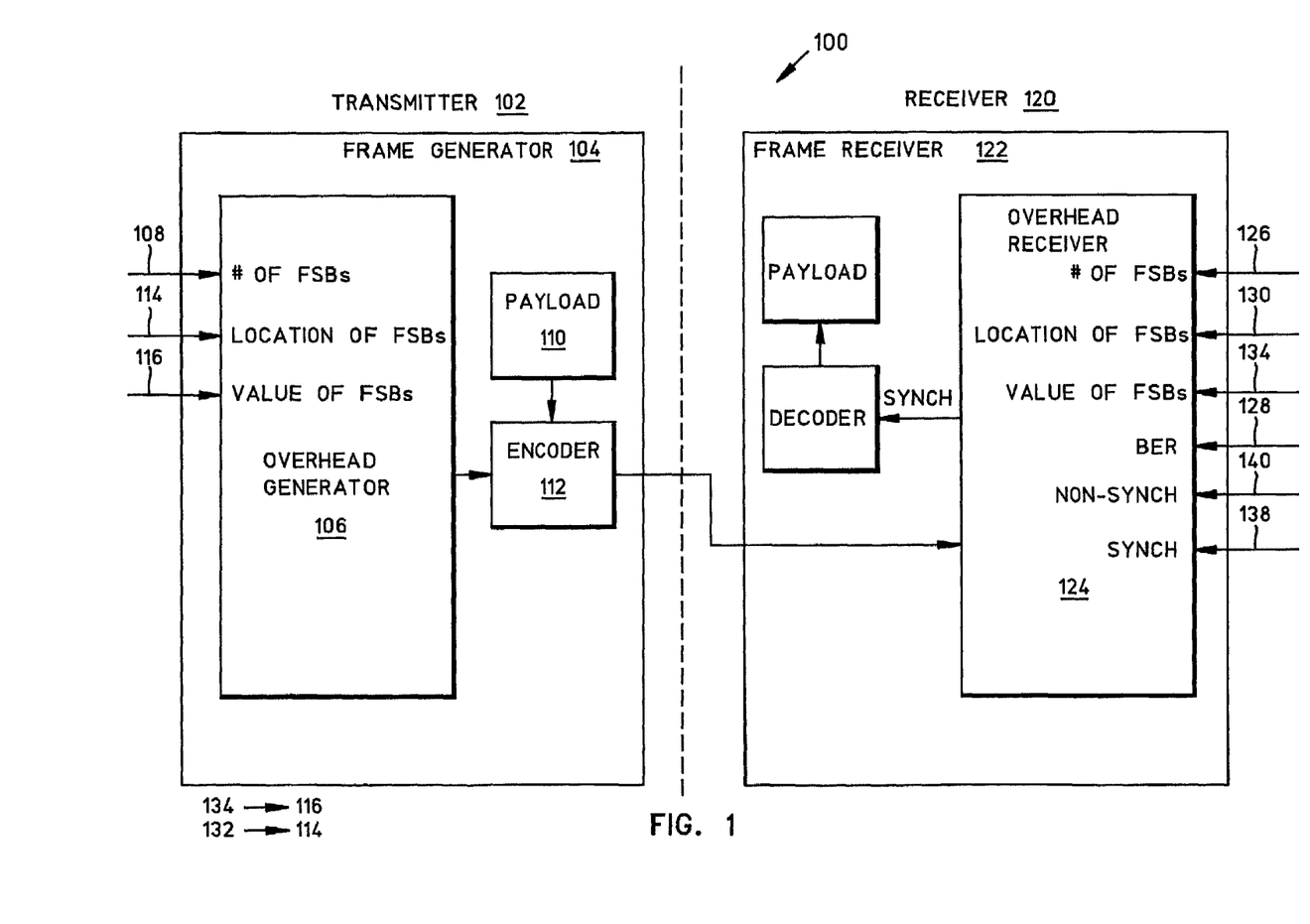
FIG. 1 is a schematic block diagram of a system for variably programming frame synchronization in the communication of a multidimensional digital frame structure.

FIG. 1 is a schematic block diagram of a system for variably programming frame synchronization in the communication of a multidimensional digital frame structure. The system 100 comprises a transmitter 102 with a frame generator 104. The frame generator 104 includes an overhead generator 106 having an input to accept commands on line 108 for selecting the number of frame synchronization bytes in the overhead section of a frame. A payload generator 110 supplies the information that is to be transmitted. The information can be generated at the transmitter 102, or it can be the payload of a previously received frame. In this case, the transmitter 102 would be acting as a relay. The frame generator 104 also includes an FEC section, or encoder 112. The encoder codes the payload so that errors due to degradation can be removed at the destination. In some aspects of the invention, parts of the overhead section, or the entire overhead section is encoded, along with the payload. Commands for selecting the location of FSBs are accepted on line 114, and commands for selecting FSB values are accepted on line 116.

Figure 2:
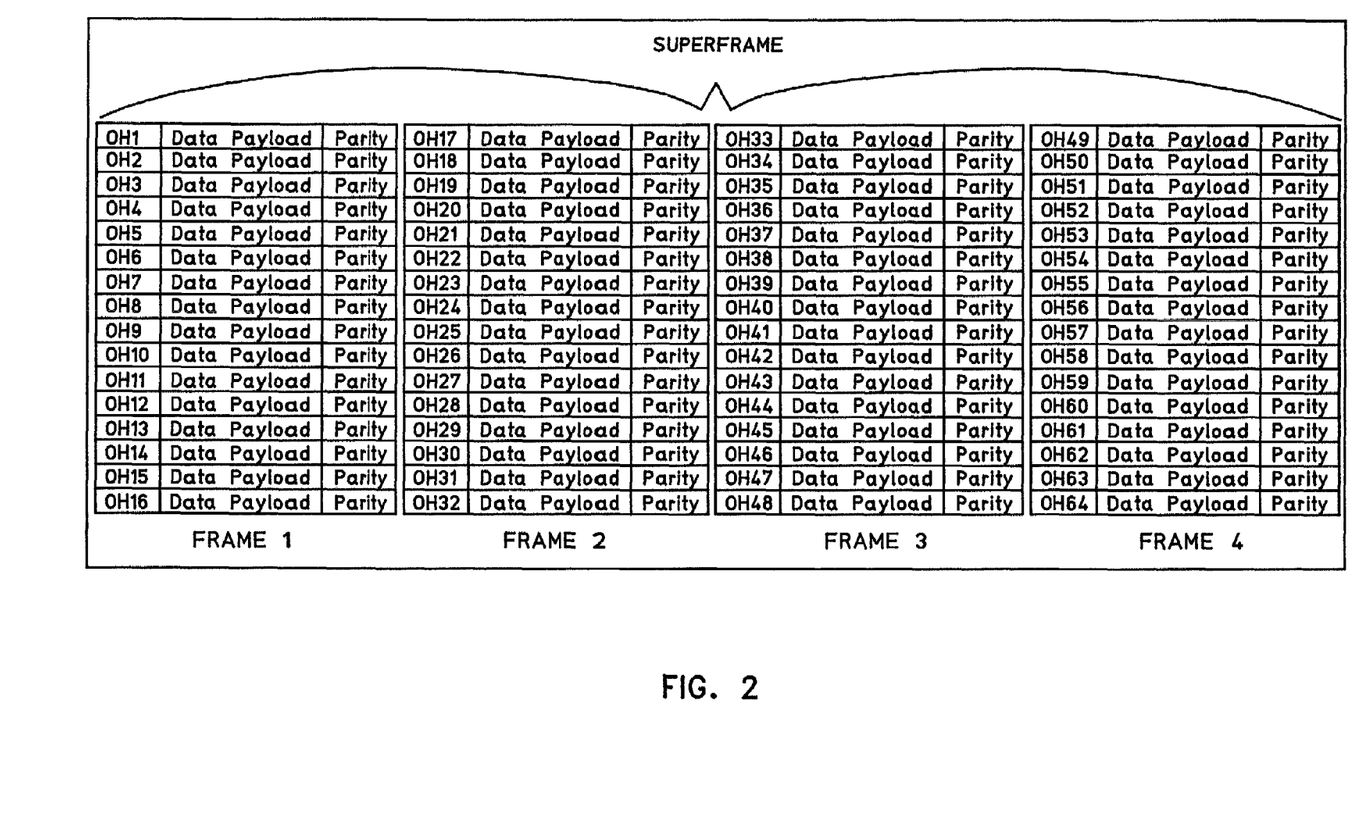
FIG. 2 is a diagram illustrating a multidimensional digital frame structure.

FIG. 2 is a diagram illustrating a multidimensional digital frame structure. As can be seen from examining Frame 1, each frame is considered to be multidimensional because it includes a plurality of rows, where each row includes an overhead byte, payload bytes, and parity (FEC) bytes. The present invention is not limited to any particular number of bytes to the overhead, payload, and FEC sections, or to any particular number of rows.

Returning to FIG. 1, the system 100 includes a receiver 120 with a frame receiver 122. The frame receiver 122 includes an overhead receiver 124 with an input on line 126 to accept commands for selecting the number of frame synchronization bytes for synchronizing the received frame. The overhead receiver 124 synchronizes the frame in response to recognizing the selected frame synchronization bytes. In other aspects of the invention, the frame synchronization function is performed by other elements of the receiver 120 (not shown). Once the FSBs have been identified, synchronization is possible. The frame can be decoded and the payload identified. In some aspects of the invention, the receiver 120 is part of a relay, and the payload is relayed as is, or modified before it is retransmitted. FSB bit error rate commands are accepted on line 128, FSB location commands are accepted on line 130, and FSB value commands are accepted on line 134.

Returning to FIG. 2, it can be seen that a superframe includes a plurality of interleaved frames. Four frames are shown, but the present invention is not limited to any particular number of frames per superframe. Returning to FIG. 1, the frame generator 104 defines a superframe structure with a predetermined number of frames per superframe. Then, the overhead generator 106 selects a quantity, or number of bytes to be used for synchronization in the overhead section of each frame of the superframe. Likewise, the overhead receiver 124 recognizes frame synchronization bytes in each frame of the superframe. In some aspects of the invention, the overhead receiver 124 selects the quantity of frame synchronization bytes required for recognition, for each frame.

Following the example of FIG. 2, the frame generator 104 forms a superframe consisting of a first, second, third, and fourth frame, and the overhead generator 106 supplies a first number of overhead bytes for the first frame, a second number of bytes for the second frame, a third number of bytes for the third frame, and a fourth number of bytes for the fourth frame. The first, second, third, and fourth numbers are not necessarily different values. Typically, however, only the first frame includes FSB bytes, so that the overhead generator selects a second, third, and fourth number of bytes equal to zero.

In a simple case, the frame receiver 122 forms a superframe consisting of a first, second, third, and fourth frame, and the overhead receiver 124 selects a first number of overhead bytes for the first frame, a second number of bytes for the second frame, a third number of bytes for the third frame, and a fourth number of bytes for the fourth frame. Again it is typical that the overhead receiver 124 selects a second, third, and fourth number of bytes equal to zero.

The overhead receiver 124 also selects the number of consecutive frames that must be recognized on line 138, and synchronizes the received superframe in response to the selected number of recognized frames. For example, the system may require that FSBs in two consecutive frames be identified, before a superframe is recognized. Likewise, the system may require that a plurality of consecutive superframes be recognized before synchronization occurs. More typically, frame synchronization bytes in the first frame of two consecutive superframes must be recognized.

In some aspects of the invention, the overhead receiver 124 selects a quantity of bytes for each frame of the superframe, and recognizes the selected quantity of frame synchronization bytes in each frame of the superframe. For example, the overhead receiver 124 selects a first number of bytes for a first frame of the superframe, and synchronizes the first frame by recognizing the first number of bytes in the first frame of the superframe.

In a simple aspect of the invention, the overhead receiver 124 selects the same number of FSBs that are supplied by the overhead generator 106. That is, the overhead generator 106 selects a first number of frame synchronization bytes in the overhead section of a frame, and the overhead receiver 124 selects the first number of frame synchronization bytes for recognition for the first frame. However, the overhead receiver need not select all the FSBs that have been supplied by the overhead generator 106. For example, when the overhead generator supplies a first number of frame synchronization bytes for a first frame, the overhead receiver 124 can select a second number of bytes, less than the first number, for the first frame. The overhead receiver synchronizes the received frame in response to recognizing the second number of frame synchronization bytes in the first frame. The above-described operation may be required when communicating nodes do not use identical protocols. Protocol translation functions of the invention are described in detail in "System and Method For Translating Overhead bytes in a Multidimensional Digital Frame Structure", G. Bendak et al., filed Dec. 22, 2000, application Ser. No. 09/746,159.

In some aspects of the invention, the overhead receiver 124 has an input on line 128 to accept commands for selecting the bit error rate (BER) required for the recognition of a frame synchronization byte. For example, the overhead receiver 124 can select a number of permitted errors for each frame synchronization byte in the range from zero to a second plurality of errors, where each byte includes a second plurality of bits. Note that independent BERs can be set for different quantities in recognizing FSBs in a single frame. Likewise, the BER can be set for different values between frames, or between superframes. The BER can be made to correspond to the FSB location and/or the FSB value. More typically, the selected BER defines the average BER for the selected number of FSBs on a frame-by-frame basis. Regardless, the overhead receiver 124 recognizes frame synchronization bytes having a bit error rate less than, or equal to, the selected frame synchronization bit error rates.

In some aspects of the invention, the overhead receiver 124 accepts commands for selecting the location of the bytes on line 130 to be used for the frame synchronization of received frames. The overhead receiver 124 synchronizes the received frame in response to recognizing frame synchronization bytes in the selected locations. For example, the overhead receiver 124 selects a first number of byte locations, and synchronizes the received frame in response to recognizing frame synchronization bytes in the first number of selected locations.

The frame locations can vary between frames, and between superframes. For example, the overhead receiver 124 selects a first number of locations in a first frame of the superframe, and a second number of locations in a second frame. Then, the overhead receiver synchronizes the received frame in response to recognizing frame synchronization bytes in the first number of selected locations in the first frame and the second number of selected locations in the second frame. Looking at FIG. 2 momentarily to refine the above-mentioned example, locations OH 1, OH 2, and OH 3 can be selected for the first frame, while locations OH 5, OH 6, and OH 7 can be selected for the second frame. This example would, of course, require the overhead generator 106 to supply FSBs in at least the above-mentioned byte locations.

In a simple aspect of the invention, the overhead generator 106 selects a first number of locations for a first number of frame synchronization bytes, in response to commands on line 114, and the overhead receiver 124 selects the first number of locations for the first number of frame synchronization bytes. However, the overhead receiver need not select all the locations provided by the overhead generator 106. For example, the overhead generator 106 selects a first number of locations for a first number of frame synchronization bytes, and the overhead receiver 124 selects a second number of locations for a second number of frame synchronization bytes, less than the first number, and synchronizes the received frame in response to recognizing frame synchronization bytes in the second number of selected locations. Momentarily examining FIG. 2, the overhead generator 106 may supply FSBs in locations OH 1 through OH 6, while the overhead receiver selects locations OH 4 through OH 6 for use.

In some aspects of the invention, the selection of the FSB locations, by default, selects the number of FSBs. However, the number of FSBs need not always equal the selected number of FSBs. In some aspects, the system 100, may decide to "rob bytes", or use FSB byte locations for other purposes. For example, if locations OH 1 and OH 2 have been chosen as FSB locations, the transmitter 102 may be instructed to just use location OH 1 as an FSB location, with the byte in OH 2 being used as an auxiliary communication channel, for example. Thus, the system will just use location OH 1 as an FSB, dedicating location OH 2 to another purpose, and operating with occasional missed frames. In another alternative, receiver 120 may be commanded to synchronize in response to the quantity of FSBs, independent of FSB locaitons.

In some aspects of the invention, the overhead receiver accepts commands for selecting the values of each frame synchronization byte cn line 116. The overhead receiver 124 synchronizes the received frame in response to recognizing the values of synchronization bytes. Typically, the FSB word is a byte of eight bits, although the invention is not limited to an FSB word of any particular length. With eight bit values, $2^8$ possible FSB values are possible. Thus, each frame can be synchronized using FSBs having different values. In one aspect of the invention, the overhead receiver 124 selects a first number of frame synchronization bytes having a first value and a second number of frame synchronization bytes having a second value. Then, the overhead receiver 124 synchronizes the received frame in response to recognizing the first number of frame synchronization bytes having the first value and the second number of frame synchronization bytes having the second value. Although an example using two different FSB values is presented above, it is possible to have as many FSBs as there are rows in a frame. Thus, in the frame structure of FIG. 3, each frame could have a first plurality (sixteen in the example of FIG. 2) unique FSB values. Even more FSB values could be used if a greater portion of each row was devoted to the overhead section, at the expense of the payload or FEC sections.

Likewise, the value of the FSBs can change between frames. In some aspects of the invention, the overhead receiver 124 selects a first number of frame synchronization bytes having a first value in a first frame and a second number of frame synchronization bytes having a second value in a second frame, The overhead receiver synchronizes the received frame in response to recognizing the first number of frame synchronization bytes having the first value in the first frame and the second number of frame synchronization bytes having the second value in the second frame.

Alternately, multiple FSB values can be used in multiple frames. For example, the overhead receiver 124 selects a first number of frame synchronization bytes having a first value and a second number of frame synchronization bytes having a second value in a first and second frame. Then, the overhead receiver 124 synchronizes the frame in response to recognizing frame synchronization bytes having the first and second values in the first and second frames.

In a simple aspect of the invention, the overhead generator 106 selects frame synchronization bytes having a first value, in response to commands on line 116, and the overhead receiver 124 selects frame synchronization bytes having the first value. However, the overhead receiver 124 need not select all the FSB values supplied by the overhead generator. For example, the overhead generator 106 selects a first number of frame synchronization bytes having a first value in a first number of locations and a second number of frame synchronization bytes in a second number of locations having a second value. The overhead receiver 124 selects a third number of frame synchronization bytes, less than the first number, having the first value, and a fourth number of frame synchronization bytes, less than the second number, having the second value. The overhead receiver 124 synchronizes the received frame in response to recognizing the third number of frame synchronization bytes having the first value, and the fourth number of frame synchronization bytes having the second value.

When the overhead receiver is not able to recognize FSBs, synchronization is lost. Once again, the way in which the system loses synchronization is programmable. The overhead receiver 124 accepts commands on line 140 for selecting a number of consecutive non-recognized frames. Then, the overhead receiver 124 falls out of synchronizing in response to the selected number of consecutively non-recognized frames.

Figure 3:
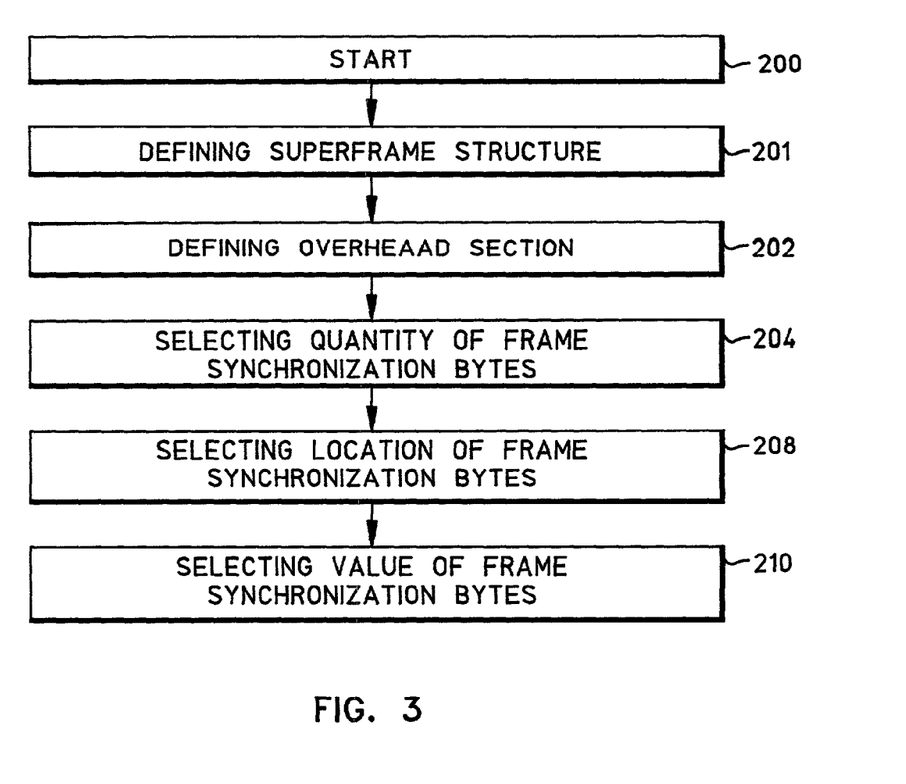
FIG. 3 is a flowchart depicting a method for variably programming the number of frame synchronization bytes in a multidimensional digital frame structure.

FIG. 3 is a flowchart depicting a method for variably programming the quantity of frame synchronization bytes in a multidimensional digital frame structure. Although the method is depicted as a sequence of numbered steps for clarity, no order should be inferred from the numbering unless explicitly stated. The method begins at Step 200. Step 202 defines an overhead section in a frame structure having a predetermined number of bytes. Step 204 selects the quantity of bytes in the overhead section to be used for frame synchronization.

In some aspects of the invention the overhead section in Step 202 includes a first plurality of bytes. Selecting the quantity of frame synchronization bytes in the overhead section in Step 204 includes selecting a number of bytes in the range from zero to the first plurality.

Step 201 defines a superframe structure with a predetermined number of frames per superframe. Selecting the number of frame synchronization bytes in the overhead section in Step 204 includes selecting the number of bytes in the overhead section of each frame.

In some aspects of the invention, defining a superframe structure with a predetermined number of frames per superframe in Step 201 includes defining a first and a second frame in the superframe. Selecting the number of frame synchronization bytes in the overhead section in Step 204 includes selecting a first number of bytes in the first frame and a second number of bytes in the second frame.

In some aspects of the invention, defining a superframe structure with a predetermined number of frames per superframe in Step 201 includes defining a superframe consisting of a first, second, third, and fourth frame. Selecting the number of frame synchronization bytes in the overhead section in Step 204 includes selecting a first number of bytes in the first frame, a second number of frame synchronization bytes in the second frame, a third number of frame synchronization bytes in the third frame, and a fourth number of frame synchronization bytes in the fourth frame. In some aspects, selecting the number of frame synchronization bytes in the overhead section in Step 204 includes selecting a second, third, and fourth number of bytes equal to zero.

Step 208 selects the location of the frame synchronization bytes in the overhead section. In some aspects of the invention, defining the overhead section of each frame in Step 202 includes defining a first plurality of overhead byte locations. Selecting the location of the frame synchronization bytes in the overhead section in Step 208 includes selecting locations in the range from zero to the first plurality of byte locations.

In some aspects of the invention, selecting the number of frame synchronization bytes in the overhead section in Step 204 includes selecting a first number of bytes. Selecting the location of the frame synchronization bytes in the overhead section in Step 208 includes selecting the first number of byte locations.

Step 210 selects the value of the frame synchronization bytes in the overhead section. In some aspects of the invention, defining the overhead section in Step 202 includes each byte having a second plurality of bits. Selecting the value of the frame synchronization bytes in Step 210 includes selecting a second plurality of bits for each frame synchronization byte.

In some aspects of the invention, selecting the number of frame synchronization bytes in Step 204 includes selecting a plurality of frame synchronization bytes having a plurality of byte values in Step 210.

In some aspects of the invention, selecting the number of frame synchronization bytes in Step 204 includes, for each frame, selecting a number of frame synchronization byte values in the range from zero to the first plurality in Step 210.

In some aspects, selecting the number of frame synchronization byte values in Step 210 includes selecting a first number of frame synchronization bytes, having a first value, and a second number of frame synchronization bytes, having a second value.

In some aspects of the invention, Step 212 selects the bit error rate required for the recognition of a frame synchronization byte. Selecting a frame synchronization byte bit error rate in Step 212 includes selecting a number of permitted errors for each frame synchronization byte in the range from zero to a second plurality of errors, where the frame synchronization bytes include a second plurality of bits. More typically, the selected BER represents the average BER of the selected number of FSBs in each frame. Thus, if four FSBs are used in a frame, the frame is recognized if the average BER of the four FSBs is less than, or equal to, the selected BER.

Figure 4:
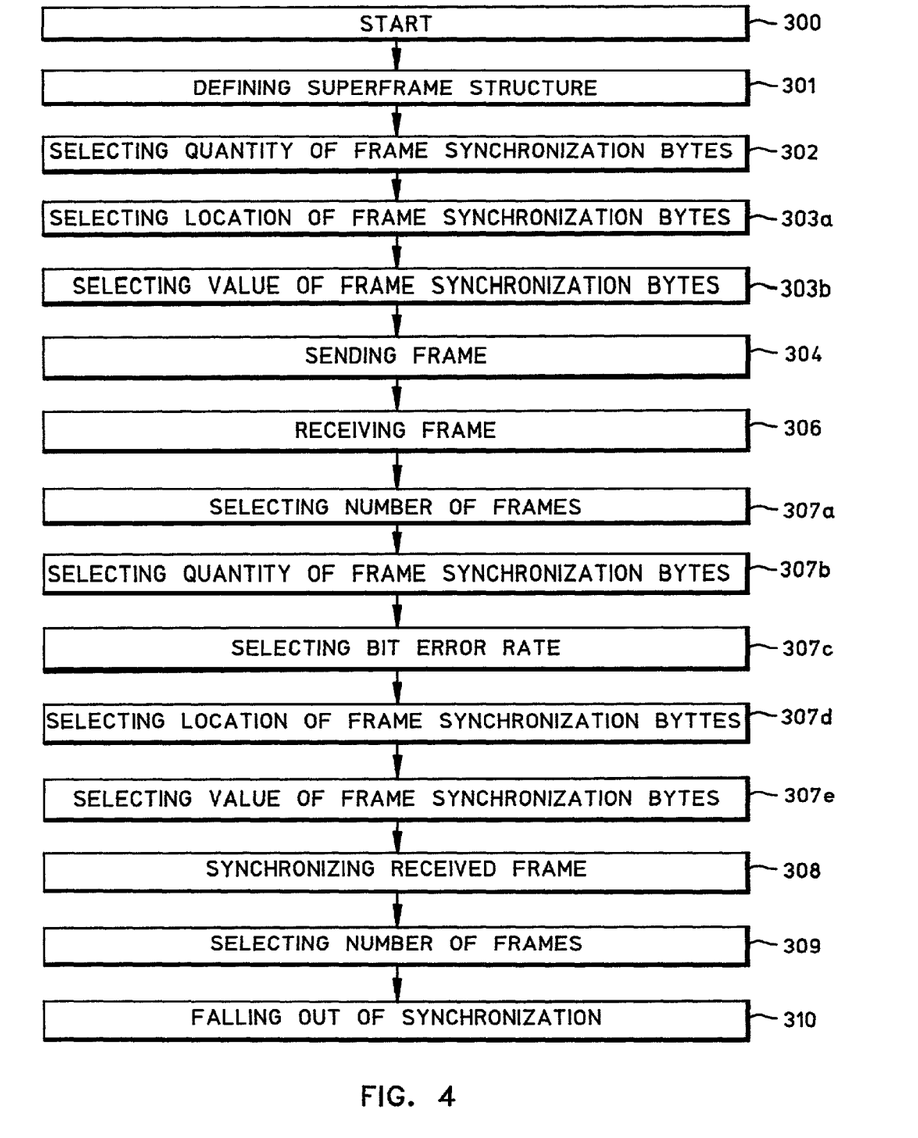
FIG. 4 is a flowchart depicting a method for variably programming the number of frame synchronization bytes in the communication of a multidimensional digital frame structure.

FIG. 4 is a flowchart depicting a method for variably programming the number of frame synchronization bytes in the communication of a multidimensional digital frame structure. The method begins at Step 300. Step 302 selects the quantity of frame synchronization bytes in the overhead section of a transmitted frame. Step 304 sends the frame. Step 306 receives the frame. Step 308 synchronizes the received frame in response to recognizing frame synchronization bytes.

Step 307a selects the number of consecutive frames that must be recognized. Synchronizing the received frame in response to recognizing the frame synchronization bytes in Step 308 includes synchronizing the received frame in response to the selected number of recognized frames.

In some aspects of the invention, for each frame, Step 307b selects the number of frame synchronization bytes required for the recognition of a received frame. Selecting the number of frame synchronization bytes required for the recognition of a received frame in Step 307b includes selecting a number of bytes for each frame of the superframe. Synchronizing the received frame in response to recognizing the frame synchronization bytes in Step 308 includes recognizing the selected number of frame synchronization bytes in each frame of the superframe.

Selecting the number of frame synchronization bytes required for the recognition of a received frame in Step 307b includes selecting a first number of frame synchronization bytes for a first frame of a superframe. Synchronizing the received frame in response to recognizing frame synchronization bytes in Step 308 includes recognizing the first number of frame synchronization bytes in the first frame of the superframe.

Selecting the number of frame synchronization bytes in the overhead section of a transmitted frame in Step 302 includes selecting a first number of frame synchronization bytes for a first frame. Selecting the number of frame synchronization bytes required for the recognition of a received frame in Step 307b includes selecting the first number of frame synchronization bytes for the first frame.

Selecting the number of frame synchronization bytes in the overhead section of a transmitted frame in Step 302 includes selecting a first number of bytes for a first frame.

Selecting the number of frame synchronization bytes required for the recognition of a received frame in Step 307b includes selecting a second number of bytes, less than the first number, for the first frame of the superframe. Synchronizing the received frame in Step 308 includes synchronizing in response to recognizing the second number of frame synchronization bytes in the first frame.

In some aspects, Step 307c selects the bit error rate required for the recognition of a frame synchronization byte. Selecting a bit error rate in Step 307c includes selecting an average BER for each frame. In some aspects, a byte is used the program the selected BER, with a BER in the range from zero to a second plurality of errors, where the programmable byte includes a second plurality of bits.

Synchronizing the received frame in response to recognizing the frame synchronization bytes in Step 308 includes recognizing frame synchronization bytes having a bit error rate less than, or equal to, the selected frame synchronization bit error rates.

In some aspects of the invention, Step 301 defines a superframe structure with a predetermined number of frames per superframe. Selecting the number of frame synchronization bytes in the overhead section of a transmitted frame in Step 302 includes selecting a number of bytes to be used for synchronization in the overhead section of each frame of the superframe. Sending the frame in Step 304 includes sending frames in the superframe structure. Synchronizing the received frame in response to recognizing the frame synchronization bytes in Step 308 includes recognizing frame synchronization bytes in each frame of the superframe.

In some aspects, Step 307d selects the location of the bytes to be used for the frame synchronization of received frames. Synchronizing the received frames in response to recognizing the frame synchronization bytes in Step 308 includes recognizing frame synchronization bytes in response to the selected locations of the frame synchronization bytes.

Selecting the location of the frame synchronization bytes of a received frame in Step 307d includes selecting a first number of locations. Synchronizing the received frame in response to recognizing the frame synchronization bytes in Step 308 includes synchronizing the received frame in response to recognizing frame synchronization bytes in the first number of selected locations.

Selecting the location of the frame synchronization bytes in Step 307d includes selecting a first number of locations in a first frame of the superframe, and a second number of locations in a second frame. Synchronizing the received frame in response to recognizing the frame synchronization bytes in Step 308 includes synchronizing the received frame in response to recognizing frame synchronization bytes in the first number of selected locations in the first frame and the second number of selected locations in the second frame.

In some aspects, Step 303a selects the location of frame synchronization bytes in the overhead section of a transmitted frame. Selecting the location of frame synchronization bytes in the overhead section of a transmitted frame in Step 303a includes selecting a first number of locations for a first number of frame synchronization bytes. Selecting the location of the bytes to be used for frame synchronization in the received frame in Step 307d includes selecting the first number of locations for a first number of frame synchronization bytes.

In some aspects of the invention, selecting the location of frame synchronization bytes in the overhead section of a transmitted frame in Step 303a includes selecting a first number of locations for a first number of frame synchronization bytes. Selecting the location of the bytes to be used for frame synchronization of a received frame in Step 307d includes selecting a second number of locations for a second number of frame synchronization bytes, less than the first number. Synchronizing the received frame in response to recognizing the frame synchronization bytes in Step 308 includes synchronizing the received frame in response to recognizing frame synchronization bytes in the second number of selected locations.

In some aspects of the invention, Step 307e selects the values of each frame synchronization byte. Synchronizing the received frame in response to recognizing the frame synchronization bytes in Step 308 includes recognizing the values of the frame synchronization bytes.

Selecting the value of each frame synchronization byte in Step 307e includes selecting a first number of frame synchronization bytes having a first value and a second number of frame synchronization bytes having a second value. Synchronizing the received frame in response to recognizing the frame synchronization bytes in Step 308 includes synchronizing the received frame in response to recognizing the first number of frame synchronization bytes having the first value and the second number of frame synchronization bytes having the second value.

Selecting the value of each frame synchronization byte in Step 307e includes selecting a first number of frame synchronization bytes having a first value in a first frame and a second number of frame synchronization bytes having a second value in a second frame. Synchronizing the received frame in response to recognizing the frame synchronization bytes in Step 308 includes synchronizing the received frame in response to recognizing the first number of frame synchronization bytes having the first value in the first frame and the second number of frame synchronization bytes having the second value in the second frame.

In some aspects of the invention, selecting the value of each frame synchronization byte in Step 307e includes selecting a first number of frame synchronization bytes having a first value and a second number of frame synchronization bytes having a second value in a first and second frame. Synchronizing the received frame in response to recognizing the frame synchronization bytes in Step 308 includes synchronizing the received frame in response to recognizing frame synchronization bytes having the first and second values in the first and second frames.

In some aspects, Step 303b selects the value of the frame synchronization bytes in a transmitted frame. Selecting the value of frame synchronization bytes of a transmitted frame in Step 303b includes selecting a first number of frame synchronization bytes having a first value. Selecting the value of each frame synchronization byte in a received frame in Step 307e includes selecting a first number of frame synchronization bytes having the first value.

Selecting the value of frame synchronization bytes in the overhead section of a transmitted frame in Step 303b includes selecting a first number of frame synchronization bytes having a first value and a second number of frame synchronization bytes, having a second value. Selecting the value of each frame synchronization byte in a received frame in Step 307e includes selecting a third number of frame synchronization bytes less than the first number, having the first value, and a fourth number of frame synchronization bytes less than the second number, having the second value. Synchronizing the received frame in response to recognizing the frame synchronization bytes in Step 308 includes synchronizing the received frame in response to recognizing the third number of frame synchronization bytes having the first value, and the fourth number of frame synchronization bytes having the second value.

In some aspects of the invention, Step 310 following synchronization, falls out of synchronization in response to frame synchronization byte non-recognition.

Step 309 selects a number of consecutively non-recognized frames. Falling out of synchronizing in response to frame synchronization byte non-recognition in Step 310 includes falling out of synchronization in response to the selected number of consecutively non-recognized frames.

An example of the above, broadly-stated invention is presented below. The typical frame structure uses a 255-byte FEC code as the basic building block which is referred to as a subframe, or row. Each subframe is defined by a Reed-Solomon (RS) codec that is intended to provide 8 byte correction capability over the 255-byte block. This codec is referred to as RS(255,239) for 8 byte correction.

Figure 5:
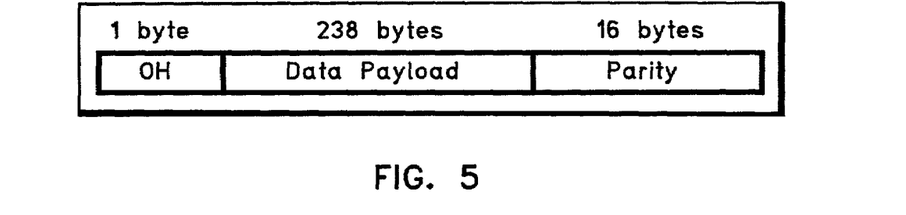
FIG. 5 is an example of a subframe consisting of a 255-byte RS(255,239) block with an overhead (OH) byte as the first byte, followed by 238 user payload bytes, and 16 bytes of RS parity.

FIG. 5 is an example of a subframe consisting of a 255-byte RS(255,239) block with an overhead (OH) byte as the first byte, followed by 238 user payload bytes, and 16 bytes of RS parity. The OH byte may be used as a Frame Synchronization Byte (FSB) or other programmable function.

Figure 6:
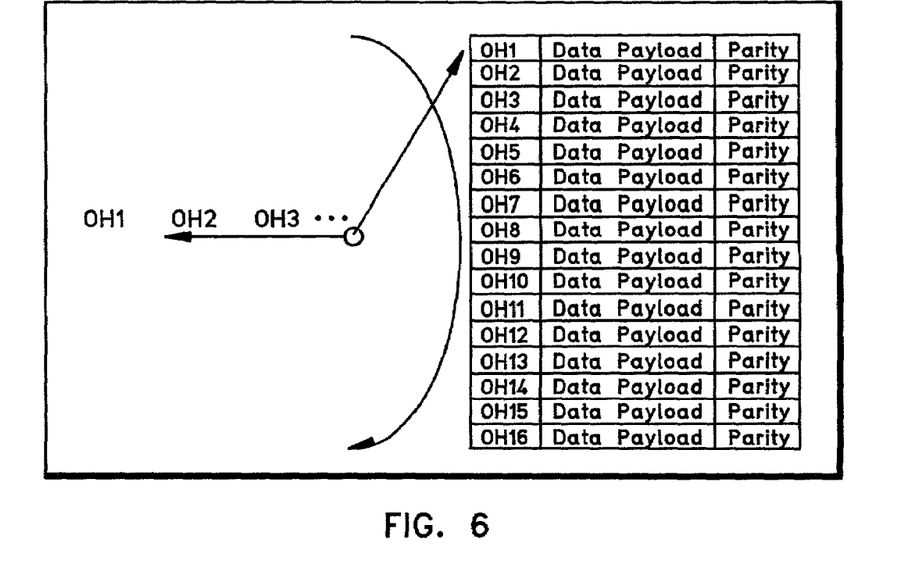
FIG. 6 illustrates the stacking of subframes in a frame.

FIG. 6 illustrates the stacking of subframes in a frame. The subframes are stacked in a structure that is 16 deep to create a frame as shown in FIG. 2. The bytes are transmitted in an interleaved fashion from top to bottom and left to right. Four frames are used to create a superframe as shown in FIG. 2. A superframe contains 64 overhead locations. The frames are transmitted in order from frame 1 to frame 4.

The first frame in the superframe is the one that traditionally contains frame synchronization bytes. The user may select to have two different FSB types (FSB1 and FSB2). The ability to have two different FSBs and the ability to program them with custom values provide the user added control over their system both in terms of resistance to false synchronization and the ability to distinguish different data sources from each other. This is useful when there are multiple wavelengths that can be received, all carrying the same frame structure, but only one of which is allowed/permissioned to be received at a particular node. Table 1 provides an example of how the FSB types are defined.

TABLE 1

Frame Synchronization Byte Definitions

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | | | | FSB 2 | | | | | | | | | FSB 1 | | | |
| Mode | rw | rw | rw | rw | rw | rw | rw | rw | rw | rw | rw | rw | rw | rw | rw | rw |
| Default | 0 | 0 | 1 | 0 | 1 | 0 | 0 | 0 | 1 | 1 | 1 | 1 | 0 | 1 | 1 | 0 |

| Bit Positions | Function | Description |
|---|---|---|
| 15:8 | FSB 2 | Frame Synchronization Byte 2 (Default value = 28h) |
| 7:0 | FSB 1 | Frame Synchronization Byte 1 (Default value = F6h) |

Accommodations are made for two separate frame synchronization bytes.

The FSBs are also programmable in number. In Frame 1, OH 1 to OH 16 can be programmed to be FSB1, FSB2, or a non-FSB function. This expands on the variability afforded by having two different FSBs. By using more of the available bandwidth for FSBs, the user decreases the chance of false synchronization and in general, decreases the amount of time required to acquire synchronization. The user can customize this parameter to optimize for specific requirements and link conditions.

Table 2 demonstrates the structure required to indicate which OH bytes are used for FSBs and Table 3 illustrates the structure that sets whether to use FSB1 or FSB2. The FSB programmability exists independently in both the transmit and receive portions of the device. In the receive section of the device, the number of recognized consecutive FSB groups required to declare synchronization is programmable, as well as the number of bad consecutive FSB groups required to lose synchronization. This is the first level of thresholding for adjusting the tolerance to bit error rate and the amount of time required to declare synchronization. Table 4 is an example of synchronization parameter setting. The fewer consecutive FSB groups required to achieve synchronization, the shorter the acquisition time. The more consecutive bad FSB groups required to lose synchronization, the greater the system tolerant of higher bit error rates.

The second level of thresholding is to define what is considered a good group of FSBs vs. a bad group of FSBs. This is done by specifying the number of errors that are allowed within a group of FSBs and still be considered good as shown in Table 4. This feature has the advantage of decreasing synchronization time in the presence of high bit error rates. Longer FSB groups are permitted which decrease the probability of false synchronization, without incurring the penalty of difficult synchronization in the presence of noise. Further, the FEC code is given greater opportunity to correct errors.

Another benefit of the second level of thresholding is the ability to dynamically customize the values of the FSBs. This thresholding provides network security, and dynamically allocates more bytes for synchronization based on the link conditions, without causing a resynchronization to occur.

TABLE 2

Frame Synchronization Byte Locations Register

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | OH #1 | OH #2 | OH #3 | OH #4 | OH #5 | OH #6 | OH #7 | OH #8 | OH #9 | OH #10 | OH #11 | OH #12 | OH #13 | OH #14 | OH #15 | OH #16 |
| Mode | rw | rw | rw | rw | rw | rw | rw | rw | rw | rw | rw | rw | rw | rw | rw | rw |
| Default | 1 | 1 | 1 | 1 | 1 | 1 | 0 | 0 | 0 | 0 | 0 | 0 | 0 | 0 | 0 | 0 |

| Bit Positions | Function | Description |
|---|---|---|
| 15 | OH#1 | 0: Not a Frame Synchronization Byte<br>1: Frame Synchronization Byte (FSB) (Default) |
| 14 | OH#2 | 0: Not a Frame Synchronization Byte<br>1: Frame Synchronization Byte (FSB) (Default) |
| 13 | OH#3 | 0: Not a Frame Synchronization Byte<br>1: Frame Synchronization Byte (FSB) (Default) |
| 12 | OH#4 | 0: Not a Frame Synchronization Byte<br>1: Frame Synchronization Byte (FSB) (Default) |
| 11 | OH#5 | 0: Not a Frame Synchronization Byte<br>1: Frame Synchronization Byte (FSB) (Default) |
| 10 | OH#6 | 0: Not a Frame Synchronization Byte<br>1: Frame Synchronization Byte (FSB) (Default) |
| 9 | OH#7 | 0: Not a Frame Synchronization Byte (Default)<br>1: Frame Synchronization Byte (FSB) |
| 8 | OH#8 | 0: Not a Frame Synchronization Byte (Default)<br>1: Frame Synchronization Byte (FSB) |
| 7 | OH#9 | 0: Not a Frame Synchronization Byte (Default)<br>1: Frame Synchronization Byte (FSB) |
| 6 | OH#10 | 0: Not a Frame Synchronization Byte (Default)<br>1: Frame Synchronization Byte (FSB) |
| 5 | OH#11 | 0: Not a Frame Synchronization Byte (Default)<br>1: Frame Synchronization Byte (FSB) |
| 4 | OH#12 | 0: Not a Frame Synchronization Byte (Default)<br>1: Frame Synchronization Byte (FSB) |
| 3 | OH#13 | 0: Not a Frame Synchronization Byte (Default)<br>1: Frame Synchronization Byte (FSB) |
| 2 | OH#14 | 0: Not a Frame Synchronization Byte (Default)<br>1: Frame Synchronization Byte (FSB) |
| 1 | OH#15 | 0: Not a Frame Synchronization Byte (Default)<br>1: Frame Synchronization Byte (FSB) |

-continued

| Bit Positions | Function | Description |
|---|---|---|
| 0 | OH#16 | 0: Not a Frame Synchronization Byte (Default)<br>1: Frame Synchronization Byte (FSB) |

This table defines which of the overhead bytes (1–16) are going to be used as FSBs

| Bit Positions | Function | Description |
|---|---|---|
| 15:12 | Check to go In-Frame | Number of correct consecutive FSB groups required to go In-Frame.<br>(Default value = 2) |

TABLE 3

Frame Synchronization Byte Types

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | OH#1 | OH#2 | OH#3 | OH#4 | OH#5 | OH#6 | OH#7 | OH#8 | OH#9 | OH#10 | OH#11 | OH#12 | OH#13 | OH#14 | OH#15 | OH#16 |
| Mode | rw | rw | rw | rw | rw | rw | rw | rw | rw | rw | rw | rw | rw | rw | rw | rw |
| Default | 0 | 0 | 0 | 1 | 1 | 1 | 0 | 0 | 0 | 0 | 0 | 0 | 0 | 0 | 0 | 0 |

NOTE:
If an OH byte is not defined to be an FSB in the Decoder Frame Synchronization Byte Locations Register, the corresponding bit in this register has no significance.

| Bit Positions | Function | Description |
|---|---|---|
| 15 | OH#1 | 0: FSB 1 (Default)<br>1: FSB 2 |
| 14 | OH#2 | 0: FSB 1 (Default)<br>1: FSB 2 |
| 13 | OH#3 | 0: FSB 1 (Default)<br>1: FSB 2 |
| 12 | OH#4 | 0: FSB 1<br>1: FSB 2 (Default) |
| 11 | OH#5 | 0: FSB 1<br>1: FSB 2 (Default) |
| 10 | OH#6 | 0: FSB 1<br>1: FSB 2 (Default) |
| 9 | OH#7 | 0: FSB 1 (Default)<br>1: FSB 2 |
| 8 | OH#8 | 0: FSB 1 (Default)<br>1: FSB 2 |
| 7 | OH#9 | 0: FSB 1 (Default)<br>1: FSB 2 |
| 6 | OH#10 | 0: FSB 1 (Default)<br>1: FSB 2 |
| 5 | OH#11 | 0: FSB 1 (Default)<br>1: FSB 2 |
| 4 | OH#12 | 0: FSB 1 (Default)<br>1: FSB 2 |
| 3 | OH#13 | 0: FSB 1 (Default)<br>1: FSB 2 |
| 2 | OH#14 | 0: FSB 1 (Default)<br>1: FSB 2 |
| 1 | OH#15 | 0: FSB 1 (Default)<br>1: FSB 2 |
| 0 | OH#16 | 0: FSB 1 (Default)<br>1: FSB 2 |

-continued

| Bit Positions | Function | Description |
|---|---|---|
| 11:8 | Check to go Out-of-Frame | Number of incorrect consecutive FSB groups required to go Out-of-Frame.<br>(Default value = 4) |
| 7:5 | Unused | |
| 5:0 | FSB Errors Allowed | The total number of erred bits allowed in a group of FSBs to still consider a match.<br>(Default value = 8).<br>This number is used regardless of the synchronization state (In-Frame or Out-of-Frame). |

Table 4 sets the synchronization thresholding parameters.

A system and method have been provided that illustrate the advantages of providing a programmable quantity of FSBs. The advantage of this invention is the ability to fully

TABLE 4

Decoder Framing Controls

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | Check to go In-Frame | | | | Check to go Out-of-Frame | | | | Unused | | FSB Errors Allowed | | | | | |
| Mode | rw | rw | rw | rw | rw | rw | rw | rw | ro | ro | rw | rw | rw | rw | rw | rw |
| Default | 0 | 0 | 1 | 0 | 0 | 1 | 0 | 0 | 0 | 0 | 0 | 0 | 1 | 0 | 0 | 0 | customize the synchronization methodology, to optimize robustness to noise and synchronization time. The invention specifically illustrates an example using programmable quantities of FSBs, programmable gain synchronization, programmable lose synchronization parameters, and programmable bit error tolerance within the FSBs themselves. However, the invention is not limited to an particular number of FSB values, FSB locations, or any specific framing structure. The invention permits users to create different networks that are logically separated from each other so that receivers can easily distinguish between different data sources. Other variations and embodiments of the invention will occur to those skilled in the art.

We claim:

1. A method for variably programming the quantity of frame synchronization bytes in the communication of a multidimensional digital frame structure, the method comprising:
   selecting the number of frame synchronization bytes in the overhead section of a transmitted frame;
   sending the frame;
   receiving the frame;
   synchronizing the received frame in response to recognizing frame synchronization bytes;
   for each frame, selecting the number of frame synchronization bytes required for the recognition of a received frame;
   selecting the number of consecutive frames that must be recognized; and
   wherein synchronizing the received frame in response to recognizing the frame synchronization bytes includes synchronizing the received frame in response to the selected number of recognized frames.

2. The method of claim 1 wherein selecting the number of frame synchronization bytes required for the recognition of a received frame includes selecting a number of bytes for each frame of the superframe; and
   wherein synchronizing the received frame in response to recognizing the frame synchronization bytes includes recognizing the selected number of frame synchronization bytes in each frame of the superframe.

3. The method of claim 2 wherein selecting the number of frame synchronization bytes required for the recognition of a received frame includes selecting a first number of frame synchronization bytes for a first frame of a superframe; and
   wherein synchronizing the received frame in response to recognizing frame synchronization bytes includes recognizing the first number of frame synchronization bytes in the first frame of the superframe.

4. The method of claim 2 wherein selecting the number of frame synchronization bytes in the overhead section of a transmitted frame includes selecting a first number of frame synchronization bytes for a first frame;
   wherein selecting the number of frame synchronization bytes required for the recognition of a received frame includes selecting the first number of frame synchronization bytes for the first frame.

5. The method of claim 2 wherein selecting the number of frame synchronization bytes in the overhead section of a transmitted frame includes selecting a first number of bytes for a first frame;
   wherein selecting the number of frame synchronization bytes required for the recognition of a received frame includes selecting a second number of bytes, less than the first number, for the first frame of the superframe; and
   wherein synchronizing the received frame includes synchronizing in response to recognizing the second number of frame synchronization bytes in the first frame.

6. The method of claim 1 further comprising:
   selecting the bit error rate required for the recognition of a frame synchronization byte.

7. The method of claim 6 wherein selecting a bit error rate includes selecting an average bit error rate for the selected number of frame synchronization bytes.

8. The method of claim 7 wherein synchronizing the received frame in response to recognizing the frame synchronization bytes includes recognizing frame synchronization bytes having a bit error rate less than, or equal to, the selected frame synchronization bit error rates.

9. The method of claim 8 further comprising:
   defining a superframe structure with a predetermined number of frames per superframe; and
   wherein selecting the number of frame synchronization bytes in the overhead section of a transmitted frame includes selecting the number of bytes to be used for synchronization in the overhead section of each frame of the superframe;
   wherein sending the frame includes sending frames in the superframe structure; and
   wherein synchronizing the received frame in response to recognizing the frame synchronization bytes includes recognizing frame synchronization bytes in each frame of the superframe.

10. The method of claim 1 further comprising:
    selecting the location of the bytes to be used for the frame synchronization of received frames; and
    wherein synchronizing the received frames in response to recognizing the frame synchronization bytes includes recognizing frame synchronization bytes in response to the selected locations of the frame synchronization bytes.

11. The method of claim 10 wherein selecting the location of the frame synchronization bytes of a received frame includes selecting a first number of locations; and
    wherein synchronizing the received frame in response to recognizing the frame synchronization bytes includes synchronizing the received frame in response to recognizing frame synchronization bytes in the first number of selected locations.

12. The method of claim 11 wherein selecting the location of the frame synchronization bytes includes selecting a first number of locations in a first frame of the superframe, and a second number of locations in a second frame; and
    wherein synchronizing the received frame in response to recognizing the frame synchronization bytes includes synchronizing the received frame in response to recognizing frame synchronization bytes in the first number of selected locations in the first frame and the second number of selected locations in the second frame.

13. The method of claim 11 further comprising:
    selecting the location of frame synchronization bytes in the overhead section of a transmitted frame.

14. The method of claim 13 wherein selecting the location of frame synchronization bytes in the overhead section of a transmitted frame includes selecting a first number of locations for a first number of frame synchronization bytes;
    wherein selecting the location of the bytes to be used for frame synchronization in the received frame includes selecting the first number of locations for a first number of frame synchronization bytes.

15. The method of claim 13 wherein selecting the location of frame synchronization bytes in the overhead section of a transmitted frame includes selecting a first number of locations for a first number of frame synchronization bytes;
    wherein selecting the location of the bytes to be used for frame synchronization of a received frame includes selecting a second number of locations for a second number of frame synchronization bytes, less than the first number; and
    wherein synchronizing the received frame in response to recognizing the frame synchronization bytes includes synchronizing the received frame in response to recognizing frame synchronization bytes in the second number of selected locations.

16. The method of claim 1 further comprising:
    selecting the value of each frame synchronization byte; and
    wherein synchronizing the received frame in response to recognizing the frame synchronization bytes includes recognizing the value of the frame synchronization bytes.

17. The method of claim 16 wherein selecting the value of each frame synchronization byte includes selecting a first number of frame synchronization bytes having a first value and a second number of frame synchronization bytes having a second value; and
    wherein synchronizing the received frame in response to recognizing the frame synchronization bytes includes synchronizing the received frame in response to recognizing the first number of frame synchronization bytes having the first value and the second number of frame synchronization bytes having the second value.

18. The method of claim 16 wherein selecting the value of each frame synchronization byte includes selecting a first number of frame synchronization bytes having a first value in a first frame and a second number of frame synchronization bytes having a second value in a second frame; and
    wherein synchronizing the received frame in response to recognizing the frame synchronization bytes includes synchronizing the received frame in response to recognizing the first number of frame synchronization bytes having the first value in the first frame and the second number of frame synchronization bytes having the second value in the second frame.

19. The method of claim 16 further comprising:
    selecting the value of the frame synchronization bytes in a transmitted frame.

20. The method of claim 19 wherein selecting the value of frame synchronization bytes of a transmitted frame includes selecting a first number of frame synchronization bytes having a first value; and
    wherein selecting the value of each frame synchronization byte in a received frame includes selecting a first number of frame synchronization bytes having the first value.

21. The method of claim 19 wherein selecting the value of frame synchronization bytes in the overhead section of a transmitted frame includes selecting a first number of frame synchronization bytes having a first value and a second number of frame synchronization bytes, having a second value;
    wherein selecting the value of each frame synchronization byte in a received frame includes selecting a third number of frame synchronization bytes less than the first number, having the first value, and a fourth number of frame synchronization bytes less than the second number, having the second value; and
    wherein synchronizing the received frame in response to recognizing the frame synchronization bytes includes synchronizing the received frame in response to recognizing the third number of frame synchronization bytes having the first value, and the fourth number of frame synchronization bytes having the second value.

22. The method of claim 1 further comprising:
    following synchronization, falling out of synchronization in response to frame synchronization byte non-recognition.

23. The method of claim 22 further comprising:
    selecting a number of consecutively non-recognized frames; and
    wherein falling out of synchronizing in response to frame synchronization byte non-recognition includes falling out of synchronization in response to the selected number of consecutively non-recognized frames.

24. In a multidimensional digital frame structure, a receiver system for variably programming the number of frame synchronization bytes, the system comprising:
    a frame receiver including an overhead receiver to receive the overhead section of a frame, a payload receiver to receive the payload section of the frame, and a decoder to provide a forward error corrected (FEC) frame;
    wherein the overhead receiver includes an input to select the quantity of frame synchronization bytes in the overhead section to be used for frame synchronization;
    wherein the frame receiver supplies a frame with a first plurality of overhead bytes; and
    wherein the overhead receiver accepts commands to select a quantity of frame synchronization bytes in the range from zero to the first plurality.

25. The system of claim 24 wherein the frame receiver forms a superframe structure with a predetermined number of frames per superframe; and
    wherein the overhead receiver selects the number of frame synchronization bytes required for the recognition of each frame of the superframe.

26. The system of claim 25 wherein the frame receiver forms a superframe with a first and a second frame; and
    wherein the overhead receiver selects a first number of selected frame synchronization bytes for the first frame and a second number of frame synchronization bytes for the second frame.

27. The system of claim 26 wherein the frame receiver forms a superframe consisting of a first, second, third, and fourth frame; and
    wherein the overhead receiver selects a first number of overhead bytes for the first frame, a second number of bytes for the second frame, a third number of bytes for the third frame, and a fourth number of bytes for the fourth frame.

28. The system of claim 27 wherein the overhead receiver selects a second, third, and fourth number of bytes equal to zero.

29. The system of claim 24 wherein the overhead receiver has an input to accept commands for selecting the location of the bytes in the overhead section to be used for frame synchronization.

30. The system of claim 28 wherein the frame receiver forms an overhead section in each frame with a first plurality of overhead byte locations; and
    wherein the overhead receiver selects the location of the frame synchronization bytes in the range from zero to the first plurality of byte locations.

31. The system of claim 29 wherein the overhead receiver selects a first number of frame synchronization bytes in the first number of byte locations.

32. The system of claim 24 wherein the overhead receiver has an input to accept commands for selecting the value of the bytes in the overhead section to be used for frame synchronization.

33. The system of claim 32 wherein the overhead receiver selects a second plurality of bits for each frame synchronization byte, where each byte includes a second plurality of bits.

34. The system of claim 33 wherein the overhead receiver selects frame synchronization byte values from a plurality of byte values.

35. The system of claim 34 wherein the overhead receiver selects frame synchronization byte values, in each frame, in the range from zero to the first plurality of byte values.

36. The system of claim 34 wherein the overhead receiver selects a first number of frame synchronization bytes, having a first value, and a second number of frame synchronization bytes, having a second value.

37. The system of claim 24 wherein the overhead receiver has an input to accept commands for selecting the bit error rate required for the recognition of a frame synchronization byte.

38. The system of claim 37 wherein the overhead receiver selects an average bit error rate for the selected number of frame synchronization bytes.

* * * * *